L. S. BURRIDGE, DEC'D.
F. O. BURRIDGE, EXECUTOR.
TYPE WRITING MACHINE.
APPLICATION FILED SEPT. 25, 1915.

1,297,085.

Patented Mar. 11, 1919.
5 SHEETS—SHEET 1.

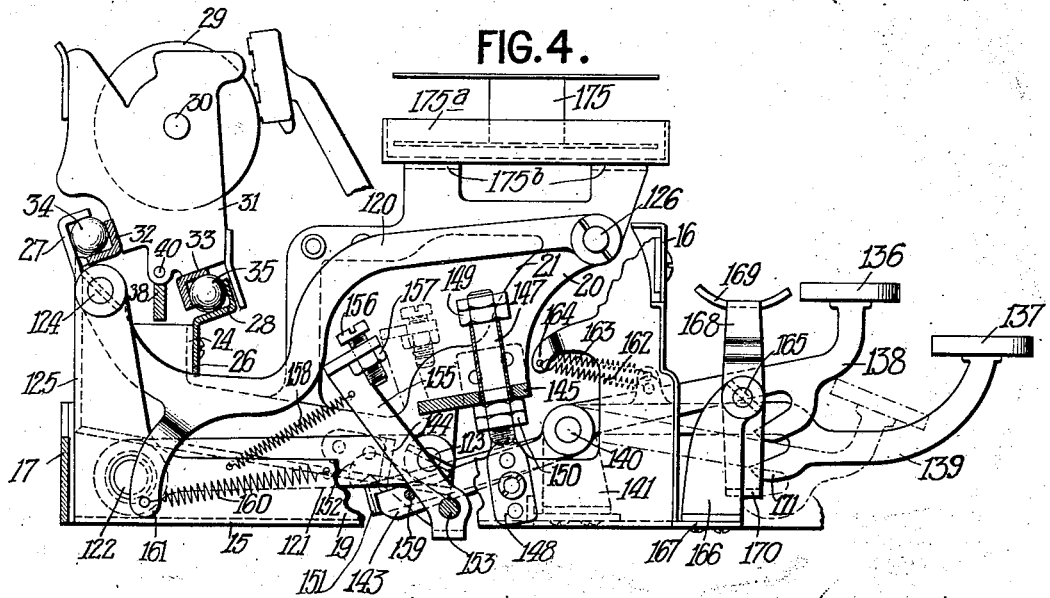

L. S. BURRIDGE, DEC'D.
F. O. BURRIDGE, EXECUTOR.
TYPE WRITING MACHINE.
APPLICATION FILED SEPT. 25, 1915.
1,297,085.
Patented Mar. 11, 1919.
5 SHEETS—SHEET 3.
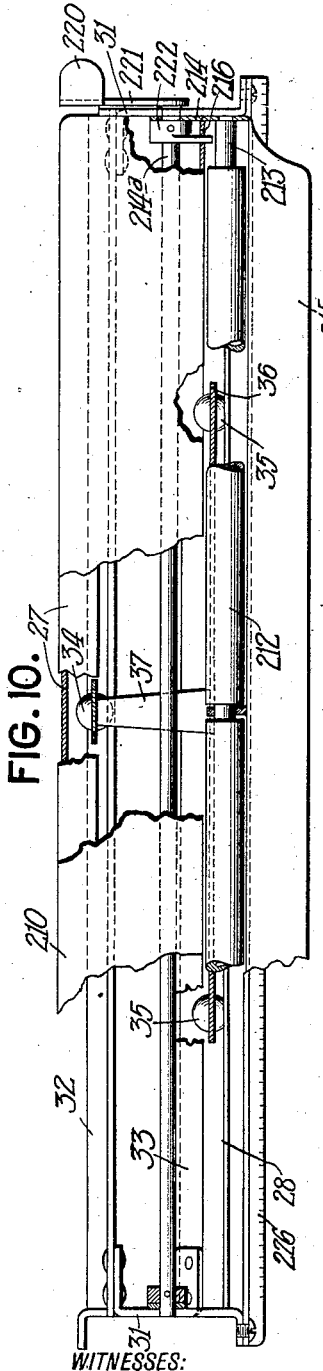
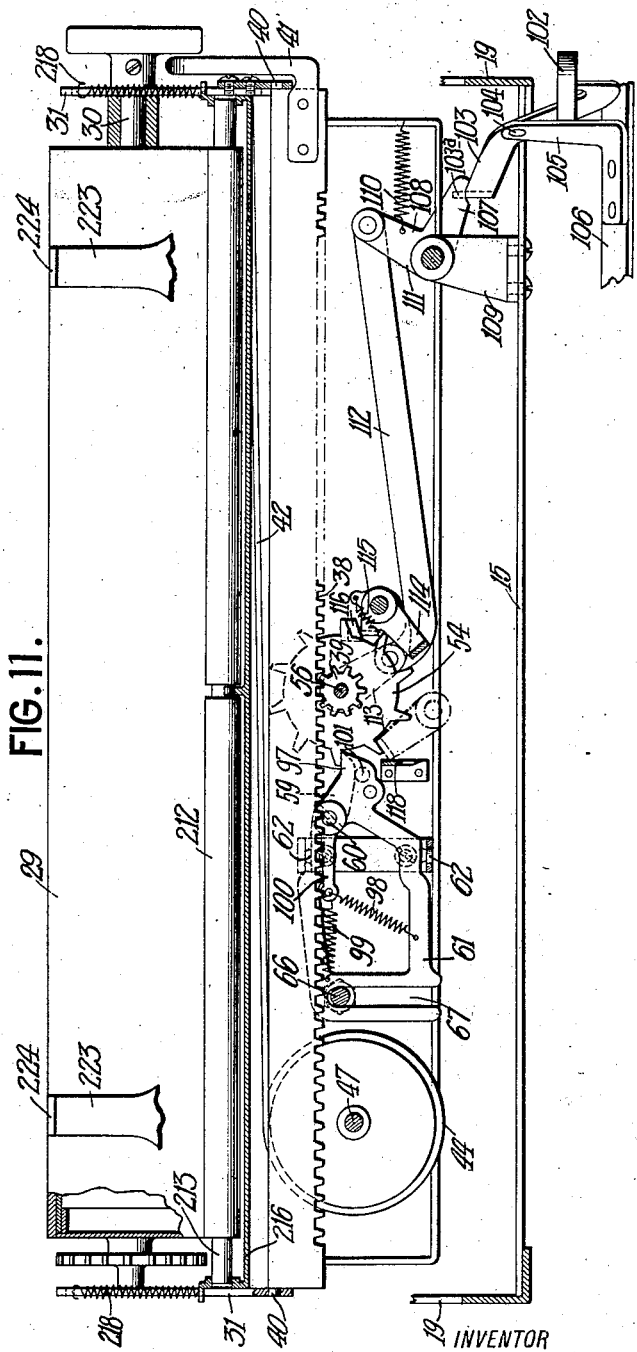

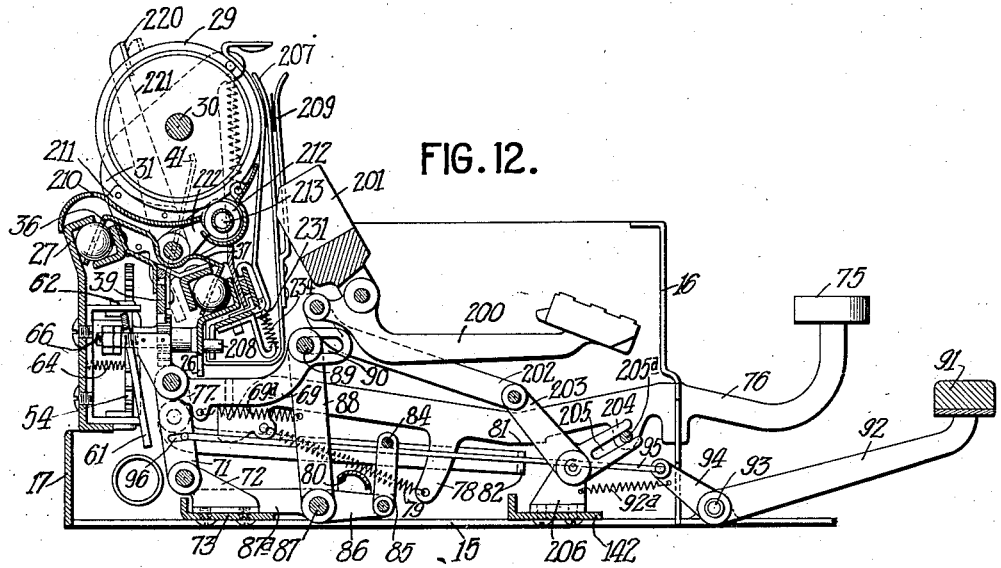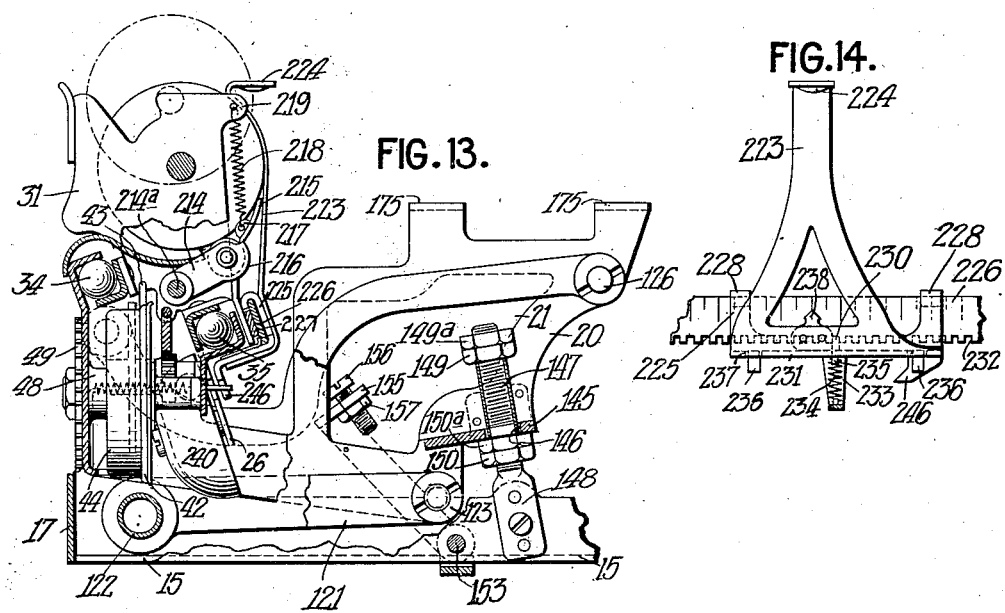

L. S. BURRIDGE, DEC'D
F. O. BURRIDGE, EXECUTOR.
TYPE WRITING MACHINE.
APPLICATION FILED SEPT. 25, 1915.
1,297,085.
Patented Mar. 11, 1919.
5 SHEETS—SHEET 5.
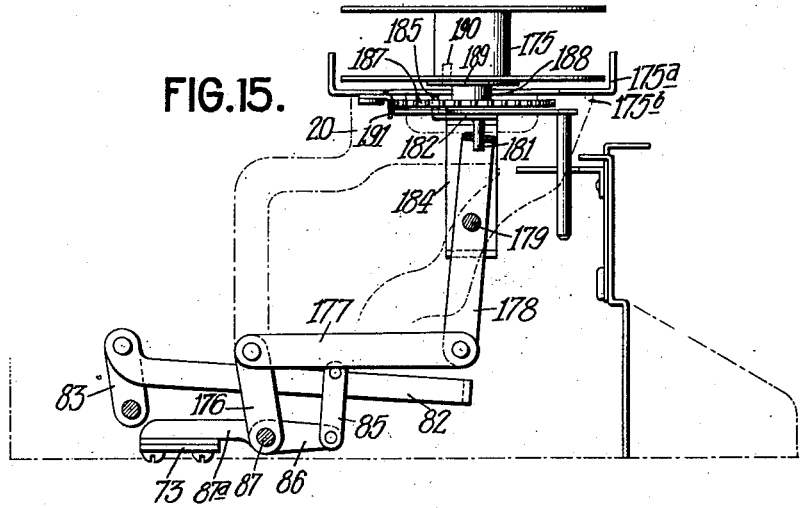
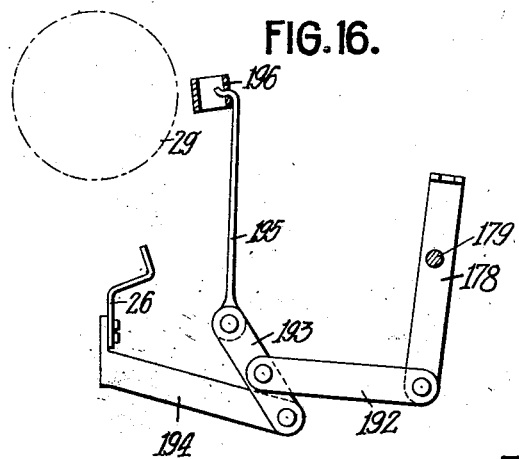
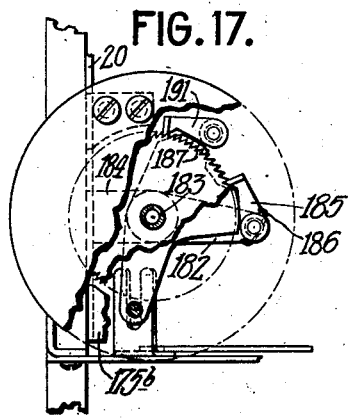
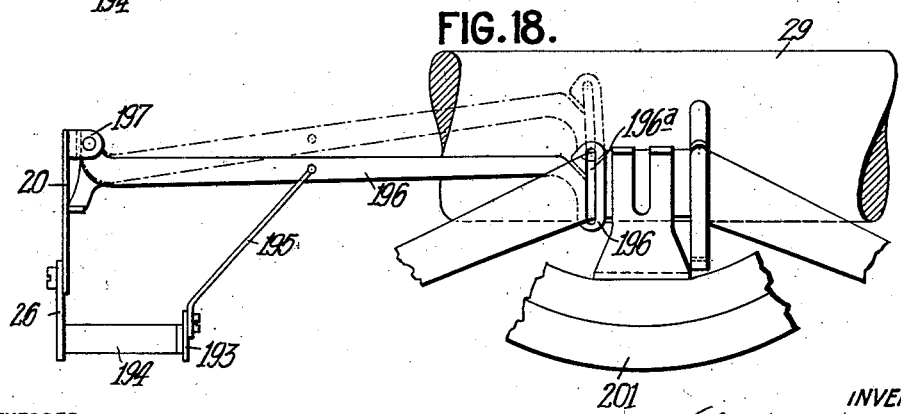
WITNESSES:
INVENTOR:

UNITED STATES PATENT OFFICE.

LEE S. BURRIDGE, DECEASED, LATE OF NEW YORK, N. Y., BY FRANCIS O. BURRIDGE, EXECUTOR, OF NEW YORK, N. Y., ASSIGNOR, BY MESNE ASSIGNMENTS, TO UNDERWOOD TYPEWRITER COMPANY, OF NEW YORK, N. Y., A CORPORATION OF DELAWARE.

TYPE-WRITING MACHINE.

1,297,085.      Specification of Letters Patent.      Patented Mar. 11, 1919.

Application filed September 25, 1915. Serial No. 52,594.

*To all whom it may concern:*

Be it known that LEE S. BURRIDGE, deceased, late a citizen of the United States, and late residing in the borough of Manhattan, county, city, and State of New York, invented certain new and useful Improvements in Type-Writing Machines, of which the following is a specification.

The present invention relates to typewriting machines. In certain of its features, it particularly relates to machines in which the platen is shiftable from one to another case-position. The invention in many of its features, however, is not so limited, and may be used in connecton with machines of quite a different character. It is especially applicable and useful where lightness, compactness, and cheapness of manufacture are important considerations.

One object of the invention is a machine, the frame-work and many other parts of which may be of sheet metal, readily stamped to form, easily assembled, strong, compact, and durable, and of such size and weight as to be portable by the operator in a small hand case; all without sacrifice of efficiency or of equipment for performing the usual functions of a typewriting machine.

Another object of the invention is to provide a novel and simple "case-shift" in which a frame, on which the platen has letter-feed and return movement, is shifted substantially rectilinearly, as a whole, between case-positions on the main frame; also a novel mechanism for effecting the shift, and for holding the shiftable frame, and for guiding the same during the shifting operation; and means whereby the case-positions may be accurately determined, and adjusted whenever desirable; and mechanism for locking the shiftable frame in any case-position to which it may have been thrown. Preferably there are three case-positions, and a feature of the invention is a mechanism for setting the machine to arrest the shiftable platen frame in a middle-case position; and for effecting this setting automatically upon operation of a key by means of which the platen frame is thrown to such middle-case position.

In a preferred form of the invention embodying the foregoing features of the "case-shift," the platen frame is movable up and down on the main frame, all parts of the platen frame having substantially the same amount of movement. For controlling this movement, and for holding the platen frame, there is provided a set of links at the side of the machine, each of these links being pivotally connected at one end to a rear part of the main frame, and at the other end to a forward part of the platen frame. The shift is primarily effected by key levers which engage the platen frame substantially centrally of the front and rear thereof, and the key action is lightened by springs which in part counteract the weight of the platen frame. Stops in the form of nuts adjustable on studs carried by the main frame, and coöperating with lugs fixed on the platen frame, determine the case-positions and provide for readjustment of the same when desired. The stop for middle-case position is normally in ineffective position, but a connection from the middle-case key lever automatically sets the middle-case stop when the middle-case shift key is operated to shift the platen frame.

For simplicity, compactness, and for other reasons, it is an object of the present invention to have, on the shiftable platen frame, the mechanism for driving the platen in letter-feed direction, the letter-feed escapement mechanism, a back-spacing mechanism, a ribbon feeding and a ribbon vibrating mechanism, and other mechanism usually found on the main frame. Various features of the invention relate to novel connections whereby these several mechanisms on the platen frame are maintained in operative relation to the keys and other parts on the main frame in all case-positions of the platen frame, and during the shifting operations.

Other features of the invention are, a novel letter-feed escapement mechanism; a back-spacing mechanism; a paper guide and feed roller support, and mechanism for shifting the same to and from the platen; an adjustable, marginal paper finger, and means for setting and shifting the same; a margin alarm; and certain combinations of these various mechanisms.

Other features and advantages will hereinafter appear.

In the accompanying drawings,

Figure 1 is a top plan view, partly in cross-section, through the main frame and platen frame, showing the connections of one frame to the other; the case-shifting mechanism; and parts of the letter-feed and other mechanisms.

Fig. 2 is a detail view in cross-section through one of the bearings by means of which the platen frame is connected to the main frame.

Fig. 3 is an end view of one of the bearing blocks shown in Fig. 2.

Fig. 4 is a view in end elevation of the mechanism shown in Fig. 1.

Fig. 5 is a view from the rear of the escapement for regulating the tension of the spring drum.

Fig. 6 is a view in cross-sectional elevation through the spring drum and associated parts, and through the guideways for the platen on the platen frame.

Fig. 7 is a view in cross-sectional elevation through the platen guideways and supports, and through one of the marginal paper fingers and associated parts; showing also the margin alarm mechanism.

Fig. 8 is a view in rear elevation of such of the letter-feed escapement mechanism, and back-spacing mechanism, as is on the platen frame.

Fig. 9 is a view in cross-section on the line 9—9 of Fig. 8.

Fig. 10 is a top plan view, partly broken, showing the platen; its bearings for letter-feed movement on the platen frame; the feed-rollers and their pressure-relieving mechanism; and other associated parts.

Fig. 11 is a view in front elevation, partly broken, of the parts shown in Fig. 10; and also of the letter-feed escapement and back-spacing mechanisms.

Fig. 12 is a view in cross-sectional side elevation through the machine, showing the letter-feed mechanism and the control of the same from the type and space keys; and showing also the feed-roller shifting mechanism; the adjustable paper fingers; the type bars; and other parts.

Fig. 13 is a broken view in side elevation showing the connections of the platen frame to the main frame; indicating the throw of the platen to upper-case position; the drum; and parts of the letter-feed escapement and feed-roller shifting mechanisms.

Fig. 14 is a view in front elevation of the right hand adjustable marginal paper finger and associated parts.

Fig. 15 is a view in side elevation of one of the ribbon feeding mechanisms and operating connections therefor to the universal bar.

Fig. 16 is a view in side elevation of the ribbon vibrator and its connections to the universal bar.

Fig. 17 is a top plan view of the ribbon feeding mechanism at one of the spools.

Fig. 18 is a front elevation of the ribbon vibrating mechanism.

The main frame of the machine comprises a base-piece 15 below the type keys, a vertical front plate 16, a rear plate 17, and side plates 19. The platen frame is shiftably mounted on the main frame, and has side plates 31 of sheet metal on the main frame, and has side plates 20 of sheet metal, cut out at 21, Figs. 4 and 13. The plates 20, at the rear thereof, are turned inward to form ears 23; and forward of the ears 23, the plates 20 have ears 24 struck inward therefrom. To the ears 23 and 24, respectively, are secured cross plates 25 and 26, the upper edges of which are offset at 27 and 28 to form grooves or tracks for balls on which the platen 29 or carriage has letter-feed and return movement. The platen is revolubly mounted at 30 on plates 31, one at each end thereof; and the plates 31 are connected by angle pieces 32 and 33, between which and the offsets 27 and 28, are held the balls 34 and 35. There are two balls 35 between the offsets 28 and the plate 33, and one ball 34 between the offset 27 and the plate 32. The balls 35 are held against longitudinal displacement by a strip of metal 36, (see Figs. 10 and 12), which is between the offset 28 and the plate 33, and which is perforated to embrace the balls 35 loosely. This piece of metal 36 has centrally thereof a finger 37 which passes over the plates 32 and 33, and is turned down between the plate 32 and offset 27; at which point it is perforated to embrace loosely the ball 34.

The plates 31, in which the platen is journaled, also carry a rack 38 which is in mesh with a pinion 39 to control the letter-feed movement of the platen. The rack 38 is pivoted at 40 to the plates 31, so that, by means of a handle 41, (see Fig. 9), secured to the rack, the rack may be swung out of mesh with pinion 39, to permit movement of the platen free of the escapement mechanism. Letter-feed movement of the platen is effected by means of a cord 42 connected at 43, (see Figs. 5 and 6), to one of the plates 31, and at its other end connected to the casing 44 of a spring drum, the spring 45 of which is connected on the one hand to the casing 44, and on the other hand to a sleeve 46 on a stud 47. The stud 47 is carried by the cross-plate 26 of the platen frame, and the sleeve 46, which is adapted to be turned thereon in adjusting the tension of the spring, has bearing in a sleeve 48 fast to the cross-plate 25 of the platen frame. The end of the sleeve 46 is threaded to receive a toothed wheel 49 and a lock nut 50. A strap 51 secured by screws 52 to the plate 25 carries an escapement dog 53 in engagement with the wheel 49, to hold the latter, and when rocked to permit of step by step movement of the spring drum to relieve the tension of the latter.

The cross plates 25 and 26 of the platen frame also carry the escapement mechanism which controls the letter-feed drive of the platen. This mechanism, (see Figs. 8, 9, and 11), comprises a ratchet wheel 54 on a hub 55, to which the pinion 39 is secured. This hub is mounted to rotate on a pin 56, one end of which has a bearing 57 on the plate 26, and the other end of which has a bearing 58 on the plate 25. Engaging the ratchet wheel is a dog 59, pivoted at 60 to a plate 61 which is adapted to be rocked on trunnions 62 on ears 63 secured to the plate 25. A spring 64 (see Fig. 1), attached at one end to the plate 25, and bearing at the other end against the rocker 61, holds the latter to a stop 65, with the dog 59 in engagement with the ratchet wheel, and returns the dog to the ratchet wheel after each type stroke. An arm 66 passes through a slot 67 in the plate 61, and carries a nut 68, which, when the arm 66 is moved forward at type strokes engages the plate 61 to rock the same on its trunnions. The arm 66 is carried by a draw-bar or link 69 which has a floating support at 70 on an arm 71 pivoted to a bracket 72 on a cross piece 73 of the main frame.

The link 69 is vibrated at type strokes by the following connections from the type keys 75. Each type key lever 76 is fulcrumed at its rear end on a blade 77. To hold the key lever to its fulcrum, a finger 78 on the lever has attached thereto one end of a spring 79, the other end of which is also attached to the lever near the rear end of the latter. The spring is bent over, and bears on, a curved plate 80, and thus exerts an upward pressure on the lever to hold the lever to the blade 77, and to return the lever to normal position after each operation thereof. Each key lever works in a slot in the front plate 16 of the main frame, and the upper and lower walls of the slot determine the normal position and throw of the lever. Each key lever has a shoulder 81 adapted to strike and depress a universal bar 82 pivoted at its rear ends to brackets 83 secured to the cross piece 73. Attached at 84 to the universal bar is a link 85, the other end of which connects to an arm 86 fast to a rock-shaft 87 journaled in brackets 87ª secured to the cross piece 73 of the main frame. Also fast to the shaft 87 is an arm 88, the upper end of which carries a pin 89 in a slot 90 in the draw-bar or link 69 which vibrates the escapement rocker 61. Depression of a type key moves the arm 88 until the pin 89 reaches the forward end of the slot 90, and thereafter moves the link 69. The key-levers are made of considerable length, which is a desideratum, and yet compactness is secured by having the rear ends of the levers extend beneath the forward carriage track 28.

The space-key 91 is carried by a lever 92 fast to a rock-shaft 93, to which is also fast an arm 94 having attached thereto a link 95, the rear end of which is offset to lie within a slot 96 in the arm 71 to which the escapement draw-bar 69 is connected. The slot 96 permits movement of the arm 71, without movement of the space-key link 95, when a type bar is depressed. Operation of the space-key draws forward the link 95, and with it the arm 66 which operates the escapement rocker 61. A spring 92ª returns the space-key and link 95 to normal position when the key is released. The spring 64 acting on the rocker 61 returns the arm 71 and link 69 to normal position, and after each type stroke, a spring 69ª connecting the link 69 to the lever 88 returns the latter, and with it the universal bar, to a normal position determined by the end wall of the slot 90 in the link 69.

At each operation of a type key, or of the space-key, the dog 59 is thrown backward out of the ratchet wheel 54, and another dog 97 fixed on the rocker 61, is brought into the ratchet wheel temporarily to hold the latter. As soon as the dog 59 is released from the ratchet wheel, springs 98 and 99, each attached at one end to the plate 61 and at the other end to a tail 100 on the dog 59, by their joint action throw the dog 59 to the dotted position shown in Fig. 8. Spring 99 prevents such throw of the dog as would carry it out of reach of the ratchet wheel. On release of the type key, the spring 64 throws the dog 97 out of the ratchet wheel, and causes the dog 59 again to enter the same, this time, however, behind the tooth previously held by it, so that the wheel, under the action of the spring drum advances a step, before it and the dog 59 are stopped by engagement of the latter with a stop 101 on the rocker 61. The rocker 61 at the part thereof engaged by the arm 66 is inclined, (see Fig. 12), in the direction in which the platen is shifted between case-positions, so that in all case-positions the rocker receives the same amount of movement when vibrated. The slot 67 allows for the case-shift.

A back-spacer is also carried by the platen frame. (see Figs. 8, 9 and 11). The back-spacing key 102 is on a lever 103 pivoted at 104 to a bracket 105 on a cross piece 106 of the main frame. The lever 103, when rocked, engages one arm 107 of a bell-crank lever 108 pivoted on a bracket 109, also on the main frame, and rocks the bell-crank against the action of a spring 110. The other arm 111 of the bell-crank connects by a link 112 to an arm 113 loose on the pin 56 which serves as the axle of the escapement wheel 54. The arm 113 has pivoted thereto a dog 114, which a spring 115 tends to throw into the wheel 54, but which is normally held out of the wheel by a guard 116 on the plate 25 of the platen frame. A tooth 117 on the dog 114 coöperates with the guard 116 for this purpose. When depression of the back-spacing key 102 moves the link 112, the arm 113 is swung down, away from the guard 116. When so moved a sufficient distance, the dog 114 is forced by the spring 115 into engagement with the wheel 54, and further movement of the arm 113 causes the wheel 54 to be turned back one step. In this operation, the dog 59 is cammed up by the tooth below it on a ratchet wheel, and then snaps back into place below that tooth. A stop 118 on the plate 25 of the platen frame, (see Fig. 11). determines the throw of the parts in back-spacing direction. When the back-space key is released the spring 110 returns it and the dog carrying arm 113 to Fig. 8 position. The teeth of the wheel 54 are so shaped as to cause the dog 114 to be cammed out of the wheel in this return movement; and the dog is finally held out of the wheel by the guard 116. The back-spacing connections are maintained in all case-positions of the platen frame, because a shift of the platen frame merely changes the normal angular position of the link 112, without affecting the back-spacing action thereof. The spring 110 holds the bell-crank lever 108 to the key lever, and a slotted plate 103ª arrests the key lever 103, and the parts actuated by spring 110, in normal position.

It has been stated that the platen frame, with the various parts carried thereby, may be moved on the main frame between three case-positions. For this purpose it is connected to the main frame, at each side of the machine, by two arms or links 120 and 121. The arms or links 121 are straight arms, pivotally secured at one end, at 122, to the lower rear part of the plates 19 of the main frame, and pivotally secured at the other end, at 123, to the lower front part of the plates 20 of the platen frame. The arms or links 120 are curved, to clear certain parts of the machine, and are pivotally secured at one end, by shouldered screws 124, to upward projections 125 of the plates 19 of the main frame, and at the other end, at 126, to the upper forward part of the plates 20 of the platen frame. The heads of said screws 124 may confine the carriage-track frame 20, 25, 27, 28 against lateral displacement. The arms 120 and 121, while maintaining the connection of the frames, permit the platen frame to be lifted and lowered on the main frame as indicated in Fig. 13, and guide the platen frame in its movements. The arms 121 (see Figs. 2 and 3) are not directly pivoted to the frame plates 19, but are fast to a sleeve 127 which is journaled on gudgeons 128 carried by blocks 129, secured by screws 130 to the frame plates 19. Each gudgeon has a key or lug 131 fitted in a recess or slot in its supporting block, and a screw 132 holds the gudgeons to the block. The gudgeons have reduced ends 133 to receive a piece of tubing 134, which, by bearing against the shoulders 135, prevent the blocks 129 and the frame members 19 from jamming the arms 121. The arms 121 are therefore not in contact with the frame, and are assured of easy movement.

In Fig. 4 the parts are shown in lower-case position. For shifting the platen frame to upper-case position there is a key 136, and for shifting the platen frame to middle-case position there is a key 137. The key levers 138 and 139 are pivoted at 140 on a standard 141 secured to a cross-bar 142 of the main frame. The lever 138 of the upper-case key has an arm 143 projecting rearward under a lug or offset 144 on the left side plate 20 of the platen frame. When the key is depressed, its lever engages this lug and thereby lifts the platen frame. For determining the throw of the platen frame when it is so lifted, the side plate 20 has fixed thereon another lug or offset 145 having a hole 146 therethrough. A post 147 secured at 148 to the main frame passes through the hole 146, and is threaded at its upper end to receive stop and lock nuts 149 and 149ª, which when the platen frame is lifted a sufficient distance, are engaged by the lug 145 to determine the upper-case position of the platen frame. The post 147 is also threaded at its lower part to receive stop and lock nuts 150 and 150ª for determining the normal or lower-case position of the platen frame. Both sets of nuts are adjustable along the post so that the case-position may be accurately determined and resetting thereof effected when desired. Suitable clearance is provided between the post and the lug 145 to prevent binding of the parts.

For shifting the platen frame to middle-case position, the lever 139 of the key 137 is also extended under the lug 144, so that, by means of the latter, the platen frame may be lifted when key 137 is depressed. The lever 139, however, has at its end a lateral offset or tooth 151 adapted, when the key 137 is depressed, to engage an arm 152 on a rock-shaft 153 which bears in the side plates 19 of the main frame. The shaft 153 is shown as a flat bar having its ends offset and perforated to receive screws 154, which protrude from the side plates 19, and serve as bearings for the shaft. This shaft 153 also carries an arm or post 155, which, when the shaft is rocked by the lever 139, is swung from the full, to the dotted line, position shown in Fig. 4. At its upper end, the arm 155 carries a stop in the form of a screw 156 adjustably locked to the arm 155 by a nut 157. This stop is swung by the action of key lever 139 into the path of the lug 145 on the platen frame, so that when the frame is lifted by the pressure of the lever on the lug 144, the lug 145 finally strikes the stop 156, and the middle-case position of the platen frame is thus determined. A spring 158 throws the stop 156 and rock-shaft 153 to normal position, determined by a stop pin 159 on the main frame, as soon as the key 137 is released. The adjustability of the stop 156 provides for accurate determination of the middle-case position, and for re-setting thereof when desired. Springs 160 attached at one end to fingers 161 on the arms 120, and at the other end to the main frame plate 19, assist in the shifting operation, and thereby provide for a light action of the shift keys. Springs 162 and 163, each attached at one end to its respective shift key lever, and at the other end to a lug 164 on the main frame, return the keys to normal position when the same are released.

For locking the keys and platen frame in the case-position to which they have been moved, there is pivoted at 165 on a standard 166, secured to a cross piece 167 of the main frame, a lever 168, the upper end of which carries a finger piece 169, and the lower end of which carries a tooth 170. Each of the shift-key levers has on its under edge a tooth or detent 171, which, when the key is operated, is brought to a position such that the tooth 170 on the lock-lever 168 may be swung over the tooth 171 on the depressed shift lever, as shown in dotted lines in Fig. 4, thus preventing a return of the shifted parts when the finger is removed from the shift key.

The ribbon is fed at type strokes from one to the other of the spools 175, which are carried in cups 175ᵃ attached to ears 175ᵇ on the side plates 20 of the shiftable platen frame. Fast to the shaft 87, at each side of the machine, is an arm 176 connected by a link 177 to a lever 178 pivoted at 179 at an intermediate point thereof on a bracket secured to the adjacent side plate 20 of the platen frame. The upper end of each lever 178 is turned horizontally, and is forked to engage a pin 181 depending from an arm 182 loose on the spool shaft 183. The spool shaft is held fixedly in a bracket 184 on the side plate 20 of the platen frame. The arm 182 has pivoted to its outer end a dog or pawl 185, resiliently held by a spring 186 in engagement with a toothed wheel 187 fast to a hub 188 adapted to be turned on the spool shaft. Also fast to the hub 188 is a collar 189 carrying a pin 190 adapted to be interlocked with the spool 175 when the latter is slipped down over the shaft 183. At each type stroke the arm 182, with the dog 185, is vibrated; and the tooth of the dog is so adapted that, as it is rocked in one direction, it carries the toothed wheel 187 and spool with it, whereas as it rocks in the other direction, the dog is cammed out of the wheel and rides idly over the same. A spring dog 191 holds the toothed wheel against accidental displacement. Each spool 175 has its independent feeding connections from the universal bar, but the dogs 185 at the two spools drive in opposite directions, and only one dog at a time is effective. Any suitable setting mechanism such, for instance, as shown in my co-pending application for United States Letters Patent, Serial No. 53,220, filed September 30, 1915, (now Patent No. 1,249,022, dated December 4, 1917), may be employed to hold the dogs 185 and 191 at one of the spools in ineffective position while the ribbon feed is being effected by the other spool. The connections from the type keys to the spools are maintained in all case-positions of the platen frame, because, although the shifting of the frame lifts the levers 178, it does not break the connections of the same to the universal bar. The shift causes the levers 178 to change their angular position, but this merely causes the dog 185 to move to another set-position on the toothed wheels, after which they operate as before.

The ribbon vibrating mechanism, (see Figs. 16 and 18), comprises a link 192 which connects one of the levers 178 to an arm 193 pivotally mounted on a bracket 194 attached to the cross plate 26 of the platen frame. The arm 193 has pivotally connected thereto, a link 195, the other end of which is hooked into a ribbon carrying and vibrating arm 196, pivoted to a bracket 197 on one of the side plates 20 of the platen frame. The ribbon is threaded through a slot 196ᵃ in the carrier 196 just to the left of the printing point. As the arm 193 is rocked up and down at type strokes by the lever 178, the link 195, with the ribbon carrying arm, is vibrated up and down, to present the ribbon to the printing point, and thereafter to return it to normal position. The ribbon vibrating connections are maintained in all case-positions, because all connections from the ribbon carrier to the lever 178 are mounted on the platen frame, and because, as heretofore pointed out, the connection from the lever 178 to the universal bar is always maintained. The angular shift of the lever 178 in moving from one case-position to another results in a corresponding angular shift of the arm 193 to a new setting, but this does not affect the vibration of the ribbon carrier at type strokes. The slot 90 in the link 69 permits the full stroke of the universal bar to be employed in vibrating the ribbon, while only the final part of the stroke of the universal bar is employed in operating the carriage escapement.

The type bars 200 are pivoted to a segment 201 carried by the main frame; and each is connected by a link 202 to a bell-crank lever 203, one arm 204 of which is slotted at 205 to be engaged by a pin 205$^a$ on the proper type-key lever 76. Each bell-crank 203 is pivotally mounted on a standard 206, and the standards 206 are all secured to the cross piece 142 of the main frame. The type actions for compactness are mounted between the side plates 20 of the shiftable carriage-track frame. Near the printing point, to the right thereof, is a spring clip 207 secured at 208 to the cross piece 26 of the platen frame. The clip 207 carries a second clip 209, between which and the clip 207, the ribbon is guided and held. The clip 207 also acts as a finger to resiliently hold the paper to the platen near the printing line, and for this purpose is curved to the curvature of the platen.

A paper shelf and guide 210 has upturned flanges 211 at the ends of the platen, and by these flanges is secured to the plates 31 in which the platen is journaled. Forward of the shelf 210 are feed rollers 212 loose on a shaft 213. The shaft 213 is carried by arms 214 loose on a shaft 214$^a$ journaled on the plates 31 which carry the platen. Integral with the arms 214 is a plate having a blade-shaped part 215 forward of the feed rollers 212, to serve as a paper guide, and a plate 216 which is curved around the rollers and terminates in a straight edge at the rear thereof. The arms 214 are preferably struck from the sheet material of which this plate is formed. Also struck from the blade-portion 215 of the plate at each end thereof, is an ear 217 to which is secured one end of a spring 218, the other end of which is attached to an ear 219 on the adjacent plate 31. The springs 218 hold the feed rollers resiliently to the platen. For relieving the pressure of the feed rollers on the platen, there is a finger piece 220 on an arm 221 fixed to the shaft 214$^a$. Also fixed to the shaft 214$^a$, near each end thereof, is an arm 222, the end of which overlies the rear edge of the plate 216, on which the feed rollers are carried. A forward pull on the finger piece 220 causes the arms 222 to swing downward, and by engaging the plate 216, to move the latter with the feed rollers away from the platen against the action of the springs 218. When the finger piece 220 is released, the springs 218 return the parts to normal position, determined by contact of the rollers with the platen. The arms 221 and 222 are held in normal position, against backward movement, by engagement of the arms 222 with the paper shelf 210.

Spring clips 223 serve as fingers for holding the paper at the margin thereof. As shown in Fig. 14, these are of inverted Y-shape with a finger piece 224 at the upper end. Each clip is carried by a plate 225 (see Fig. 7), which is slidable along on the scale plate 226 to any adjusted position thereon. The scale plate is carried by a narrower bar 227, in turn secured to the plates 31 in which the platen is journaled. To secure the carrier 225 against all but sliding movement on the scale plate, the carrier has two supporting fingers 228 which lie against the face of the scale and are crimped over the top edge of the latter. The carrier 225 is also turned under the scale, and has an offset 229, Fig. 7, behind the lower edge of the same. The carrier is locked to the scale by means of a tooth 230, (see Figs. 12 and 14), on a piece 231 which connects the lower branches of the paper fingers. In locking the carrier, the tooth 230 coöperates with the teeth of a rack 232 on the lower edge of the scale. In order that the tooth 230 may engage and disengage the rack, the piece 231, with the clips 223, is movable up and down on the carrier 225. The clip piece 231 is turned under the carrier 225 (see Fig. 12), and there has an opening therein, through which passes a finger 233 on the carrier. The finger 233 serves as a support for a coil spring 234, the upper end of which bears against the clip plate 231, and is held in place by a projection 235 on the latter. This spring holds the clip plate up against its carrier, with the tooth 230 in the rack. Depression of the clip against the action of the spring 234, disengages the tooth from the rack; and, when so depressed, the clip with its carrier may be slid along the rack. Pins 236 on the carrier pass through openings 237 in the clip piece 231, and are of such length as always to lock the clip to the carrier for longitudinal movement of the two together. The pins 236 also serve to guide the clip in its rack-engaging and disengaging movements. In order that when the clip is depressed, it may be slid with the carrier, and at the same time held depressed, by a simple pull or push on the clip longitudinally of the scale, the pins 236 are sufficiently loose in the holes 237 to permit the clip to be tilted, when the tooth 230 is out of the rack, until the part 231 thereof binds with the carrier at such an angle thereto that maintained downward pressure on the clip is not necessary to keep the tooth from the rack during the sliding operation. An index piece 238 on the clip registers with the markings on the scale for determining the setting of the clip.

On the plate 26 of the platen frame is a margin alarm or bell 240. The clapper 241 of the bell is on a pin 242 supported by a coil spring 243, which at its other end is supported on a pin 244 on the cross plate 25 of the platen frame. The clapper pin 242 projects through opening 245 in the cross plate 26 of the platen frame, and lies in the path of a finger 246 on the carrier 225 of the right hand paper finger. When the letter-feed movement of the platen brings the finger 246 to the bell clapper, the alarm is sounded. The time of sounding of the alarm is therefore dependent upon the adjustment of the paper finger, and an independent setting of the alarm is unnecessary.

Variations may be resorted to within the scope of the invention, and portions of the improvements may be used without others.

Having thus described my invention, I claim:

1. In a typewriting machine, a main frame, a carriage-track frame having forward side-extensions and shiftable between three case-positions on the main frame, stops at both sides of the main frame to engage said extensions for determining said case-positions, including movable stops for determining intermediate case-shift positions, means for shifting the carriage-track frame from one to another case-position, and means controlled by said shifting means for moving the stops for the intermediate case-position simultaneously from normally ineffective positions to effective positions when the carriage-track frame is shifted to the intermediate case-position.

2. In a typewriting machine, a main frame, a carriage-track frame having forward side-extensions and shiftable between three case-positions on the main frame, and stops at both sides of the main frame to engage said extensions for determining said case-positions, the stops for upper and lower case-positions being fixed, and the stops for intermediate case-position connected to shift together from ineffective to effective position.

3. In a typewriting machine, a main frame, a frame shiftable between three case-positions on the main frame, stops on both sides of the main frame for determining said case-positions, the stops for the upper and lower case-positions being fixed, and the stops for the intermediate case-position being carried by arms connected to be simultaneously rocked to move the stops thereon between ineffective and effective positions, means for shifting the shiftable frame from one to another case-position, and means controlled by said shifting means for moving said intermediate stops to effective position when the shiftable frame is shifted to intermediate case-position.

4. In a typewriting machine, a main frame, a frame shiftable between three case-positions on the main frame, sets of stops for determining said case-positions, including intermediate shift-stops at the sides of the machine, means for shifting the shiftable frame from one to another case-position, and means for moving the stops for the intermediate case-position simultaneously from normally ineffective positions to effective positions when the shiftable frame is shifted to the intermediate case-position, said intermediate stops being independently adjustable on their supports for accurate determination of the case-positions.

5. In a typewriting machine, a main frame, a carriage-track frame shiftable between case-positions on the main frame, lugs on the carriage-track frame, posts on the sides of the main frame and each having a nut threaded thereon to be set in adjusted position thereon, said nuts projecting into the paths of said lugs, whereby when the carriage-track frame is shifted the lugs will strike the nuts and the carriage-track frame be thereby accurately arrested at both sides thereof in desired case-position, and means for shifting the carriage-track frame from one to another case-position.

6. In a typewriting machine, a main frame, a frame shiftable between three case-positions on the main frame, two fixed stops on each side of the main frame, lugs on the sides of the shiftable frame to be moved by the latter from one to the other of said stops at each side of the machine, when the shiftable frame is shifted, and by contact therewith to determine the upper and lower case positions of the shiftable frame, a third stop at each side of the machine and adapted to be moved into the paths of said lugs to determine the intermediate case-position of the shiftable frame, a key for throwing the shiftable frame from lower to upper case-position, and a second key for moving said intermediate stops simultaneously to effective positions, and for throwing the shiftable frame to intermediate case-position, determined by said movable stops.

7. In a typewriting machine, a main frame, a frame shiftable between case-positions on the main frame, a key-lever for shifting the shiftable frame, a transverse rock-shaft, arms fast to the opposite ends of the rock-shaft, means for rocking said arms and shaft from the key-lever when the latter is operated to shift the shiftable frame, and stops carried by said arms for determining the throw of the shiftable frame when the latter is shifted by the key-lever, said stops being moved by the rock shaft from normally ineffective positions to effective positions when the key-lever is operated.

8. In a typewriting machine, a main frame, a platen frame shiftable between case-positions on the main frame, a key-lever for shifting the platen frame, a rock-shaft, an arm fast to the rock-shaft, means for rocking said arm and shaft from the key-lever when the latter is operated to shift the platen frame, a second arm on said shaft having a stop thereon movable by the rock-shaft from ineffective to effective position to determine one case-position of the platen frame when the key-lever is operated, a second key-lever for shifting the platen frame, and a second stop for determining another case-position of the platen frame when said second key-lever is operated.

9. In a typewriting machine, a main frame, a platen frame shiftable between case-positions on the main frame, a key-lever for shifting the platen frame, a rock-shaft, an arm fast to the rock-shaft, means for rocking said arm and shaft from the key-lever when the latter is operated to shift the platen frame, a stop carried by said shaft for determining the throw of the platen frame when the latter is shifted by the key-lever, said stop being moved by the rock-shaft from a normally ineffective position to effective position when the key-lever is operated, and a spring for returning the stop to ineffective position when the key-lever is released.

10. In a typewriting machine, a main frame having side plates, a platen frame shiftable between case-positions on the main frame, arms or links, one at each side of the machine, each attached at one end to the platen frame and at the other end pivotally connected to the main frame, for holding and guiding the platen frame, a sleeve to each end of which one of said arms is secured, a spacing block between each of the arms and the adjacent side plate of the main frame, and gudgeons, one held to each of said blocks, to serve as bearings on which the sleeve rocks with the arms when the platen frame is shifted.

11. In a typewriting machine, a main frame having sheet metal side plates, a platen frame shiftable between case-positions on the main frame, arms or links, one at each side of the machine, each attached at one end to the platen frame and at the other end pivotally connected to the main frame, for holding and guiding the platen frame, a sleeve to each end of which one of said arms is secured, gudgeons on the side plates of the main frame to serve as bearings on which the sleeve rocks with the arms when the platen frame is shifted, said gudgeons being shouldered within the sleeve, and a tube supported on the gudgeons with the ends thereof against said shoulders to prevent interference of the side plates of the main frame with said arms.

12. In combination, a shiftable carriage-track frame comprising a rear plate, a portion whereof forms a carriage-track, side plates fixed at their rear portions to said rear plate, said side plates having forward extensions to carry ribbon-spools, a rigid connection between said side plates between their front and rear portions, said connection comprising a carriage-track, and links whereon said frame is guided up and down, said links pivoted to said side plates.

13. In combination, a shiftable frame comprising a rear plate, a portion whereof forms a carriage-track, forwardly-extending side plates, a connection between said side plates forming a companion track, said plates being extended forwardly and upwardly in front of said companion carriage-track to carry ribbon spools, and means for guiding said shiftable frame up and down.

14. In combination, a shiftable frame comprising a rear plate, a portion whereof forms a carriage track, forwardly-extending side plates, a connection between said side plates forming a companion track, said plates being extended forwardly and upwardly in front of said companion carriage track to carry ribbon spools, a transverse rock shaft below said shiftable frame, arms or links extending forwardly from said rock shaft and pivoted at their forward ends to said side plates, and a pair of guide links pivoted at their rear ends to the machine frame and extending forwardly to the upper portions of said side plates and pivoted thereto, said guide links carried downwardly at their rear portions to occupy positions below the carriage tracks.

15. In combination, an up-and-down shiftable frame comprising a rear plate, a portion whereof forms a carriage track, side plates extending forwardly from said rear plate, a companion carriage-track joining said side plates, said side plates having forward and upward extensions to carry ribbon spools, upper and lower guide links upon which said shiftable frame is mounted and whereby it is guided, and type actions mounted between said side plates.

16. In combination, an up-and-down shiftable frame comprising a rear plate, a portion whereof forms a carriage track, side plates extending forwardly from said rear plate, a companion carriage-track joining said side plates, said side plates having forward and upward extensions to carry ribbon spools, upper and lower guide links upon which said shiftable frame is mounted and whereby it is guided, and type actions mounted between said side plates and comprising key-levers extending rearwardly beneath said companion track.

17. In a typewriting machine, the combination with a main frame, of a shift-frame including a traveling carriage and tracks on which the carriage runs, a bracket on said shift-frame, a post embraced by an opening in said bracket, stops on said post adapted to limit the throw of the shift-frame, so that the post forms a connection between the main frame and the shift-frame, and a holding means comprising a screw-thread adapted to be unscrewed to break the connection between the shift-frame and the main frame.

18. In a typewriting machine, the combination with a main frame, of a shift-frame including a traveling carriage and tracks on which the carriage runs, a bracket on said shift-frame, a post embraced by an opening in said bracket, stops on said post adapted to limit the throw of the shift-frame, so that the post forms a connection between the main frame and the shift-frame, a holding means comprising a screw-thread adapted to be unscrewed to break the connection between the shift-frame and the main frame, a separate stop for arresting said shift-frame at an intermediate point, a shift-key adapted to determine whether said second stop shall be ineffective or effective to arrest the shift-frame at an intermediate point, a second shift-key adapted to shift the shift-frame the full limit between the first-named stops, and shift-levers for said shift-keys normally clear of the shift-frame, so that the shift-frame can be removed without disturbing the shift-key-levers.

19. In a typewriting machine, the combination with a main frame, of a shift-frame including a traveling carriage and tracks on which the carriage runs, a bracket on said shift-frame, a post embraced by an opening in said bracket, stops on said post adapted to limit the throw of the shift-frame, so that the post forms a connection between the main frame and the shift-frame, a holding means comprising a screw-thread adapted to be unscrewed to break the connection between the shift-frame and the main frame, links pivoted on the main frame for guiding the shift-frame, and removable screw-pivots by which said links are pivoted to the shift-frame.

20. In a typewriting machine, the combination with a main frame, of a shift-frame including a traveling carriage and tracks on which the carriage runs, a bracket on said shift-frame, a post embraced by an opening in said bracket, stops on said part adapted to limit the throw of the shift-frame, so that the post forms a connection between the main frame and the shift-frame, a holding means comprising a screw-thread adapted to be unscrewed to break the connection between the shift-frame and the main frame, a separate stop for arresting said shift-frame at an intermediate point, a shift-key adapted to determine whether said second stop shall be ineffective or effective to arrest the shift-frame at an intermediate point, a second shift-key adapted to shift the shift-frame the full limit between the first-named stops, shift-levers for said shift-keys normally clear of the shift-frame, so that the shift-frame can be removed without disturbing the shift-key-levers, links pivoted on the main frame for guiding the shift-frame, and removable screw-pivots by which said links are pivoted to the shift-frame.

FRANCIS O. BURRIDGE,
*Executor of the last will and testament of Lee S. Burridge, deceased.*

Witnesses:
   W. O. WESTPHAL,
   ARTHUR A. JOHNSON.